US009344377B2

(12) United States Patent
Pong et al.

(10) Patent No.: US 9,344,377 B2
(45) Date of Patent: May 17, 2016

(54) PACKET PROCESSING ARCHITECTURE

(75) Inventors: Fong Pong, Mountain View, CA (US); Kwong-Tak Chui, Cupertino, CA (US); Chun Ning, Cupertino, CA (US); Patrick Lau, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 998 days.

(21) Appl. No.: 12/771,453

(22) Filed: Apr. 30, 2010

(65) Prior Publication Data

US 2011/0268119 A1    Nov. 3, 2011

(51) Int. Cl.
*H04L 12/28* (2006.01)
*H04L 12/56* (2006.01)
*H04L 12/863* (2013.01)
*H04L 29/06* (2006.01)
*H04L 12/823* (2013.01)
*H04L 12/741* (2013.01)
*H04L 12/935* (2013.01)
*H04L 12/801* (2013.01)
*H04L 12/835* (2013.01)
*H04L 12/865* (2013.01)

(52) U.S. Cl.
CPC .......... *H04L 47/624* (2013.01); *H04L 29/0653* (2013.01); *H04L 47/32* (2013.01); *H04L 29/06095* (2013.01); *H04L 45/74* (2013.01); *H04L 47/12* (2013.01); *H04L 47/30* (2013.01); *H04L 47/6275* (2013.01); *H04L 49/3009* (2013.01); *H04L 49/309* (2013.01)

(58) Field of Classification Search
CPC .................. H04L 29/0653; H04L 29/06095; H04L 49/3009; H04L 49/309; H04L 45/74
See application file for complete search history.

(56) References Cited

U.S. PATENT DOCUMENTS

| | | | | |
|---|---|---|---|---|
| 5,898,687 | A * | 4/1999 | Harriman et al. | 370/390 |
| 6,147,980 | A * | 11/2000 | Yee et al. | 370/316 |
| 2002/0188839 | A1* | 12/2002 | Noehring et al. | 713/153 |
| 2003/0041172 | A1* | 2/2003 | Calvignac et al. | 709/246 |
| 2004/0013117 | A1* | 1/2004 | Hendel et al. | 370/394 |
| 2004/0143734 | A1* | 7/2004 | Buer et al. | 713/153 |
| 2004/0190508 | A1* | 9/2004 | Houghton et al. | 370/389 |
| 2005/0198007 | A1* | 9/2005 | Ossman | 707/3 |
| 2007/0002788 | A1* | 1/2007 | Schmidt et al. | 370/328 |
| 2007/0195773 | A1* | 8/2007 | Tatar et al. | 370/392 |
| 2008/0181245 | A1* | 7/2008 | Basso et al. | 370/412 |
| 2009/0186594 | A1* | 7/2009 | Kang et al. | 455/404.1 |
| 2009/0190591 | A1* | 7/2009 | Sankaran | 370/392 |
| 2010/0027425 | A1* | 2/2010 | Cheung et al. | 370/238 |

* cited by examiner

*Primary Examiner* — Lonnie Sweet
(74) *Attorney, Agent, or Firm* — Sterne, Kessler, Goldstein & Fox PLLC

(57) ABSTRACT

A method to process a packet is described herein. The method comprises receiving a packet including a header and a payload. The header is parsed using a packet processor to determine type and priority of the packet. The header is then processed using a hardware acceleration block based on one or more of incoming bandwidth, priority and type of the packet. The custom hardware acceleration block generates header modification data that is sent to the packet processor. The header is modified using the packet processor, based on the header modification data, to generate a modified header. The modified header is appended to the payload and transmitted.

24 Claims, 8 Drawing Sheets

PACKET PROCESSING ARCHITECTURE

BACKGROUND OF THE INVENTION

1. Field of the Invention

The embodiments presented herein generally relate to packet processing in a communication systems.

2. Background Art

In communication systems, data may be transmitted between a transmitting entity and a receiving entity using packets. A packet typically includes a header and a payload. Processing a packet, for example, by an edge router, typically involves three phases which include parsing, classification and action.

What is needed are methods and systems to process packets with speed as well as flexible programmability.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

The present embodiments will now be described with reference to the accompanying drawings. In the drawings, like reference numbers may indicate identical or functionally similar elements.

DETAILED DESCRIPTION OF THE INVENTION

Processing a packet, for example, by an edge router, typically involves three phases which include parsing, classification and action. In the parsing phase, the type of packet is determined and its header is extracted. In the classification phase, the packet is processed. The packet may be modified based on the protocol in use during the classification phase. In the action phase, the packet may be accepted, dropped or re-directed. Packet processing function, if performed solely by a processor, such as a MIPS®, AMD® or INTEL® processor, can be slow, especially if the packets require customized processing. In this case the processor may perform all three phases of packet processing i.e. parsing, classification and transmission. Using a processor allows for customization because it can be programmed to allow for varying packet types and fields. For example, for packets with Virtual Local Area Network (VLAN) tags, the type and priority of the packets have to be analyzed to determine the type of processing required. A processor is also relatively lower in cost and also utilizes very little chip real estate. However, the drawback of solely using a processor to process packets is that it is typically slow at processing packets because instructions have to be executed for each packet processing function.

In another example, all aspects of packet processing may be performed solely by custom dedicated hardware. However, the drawback of using solely custom hardware is that it is very expensive to customize the hardware for different types of packets. Solely using custom hardware for packet processing is also very area intensive.

The embodiments presented herein provide both flexible processing and speed by using programmable processors in conjunction with hardware acceleration blocks. This allows for the flexibility offered by a programmable processor in conjunction with the speed offered by hardware acceleration blocks.

Figure 1A:
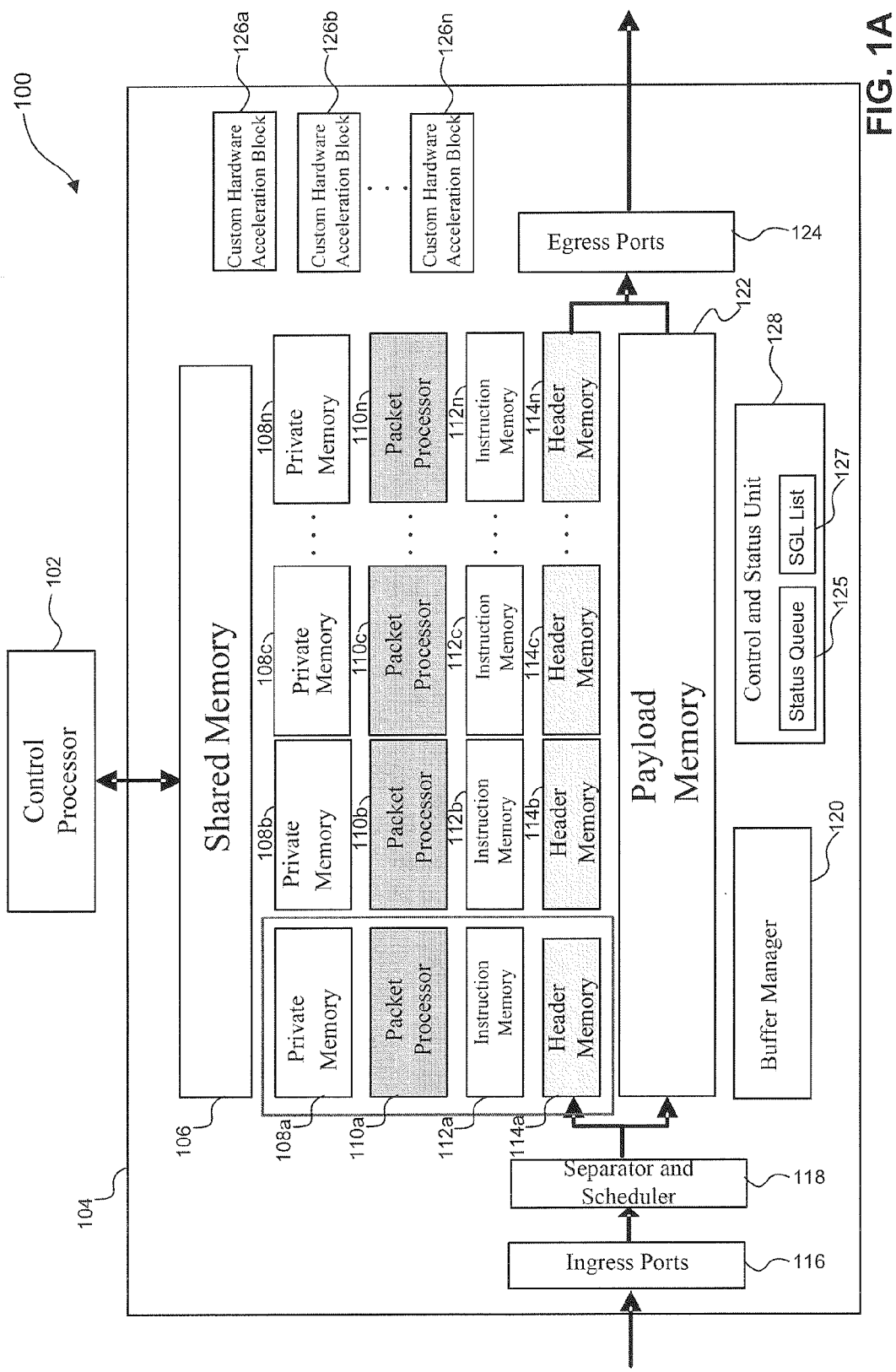
FIG. 1A illustrates an example packet processing architecture according to an embodiment.

FIG. 1A illustrates an example packet processing architecture 100 according to an embodiment. Packet processing architecture 100 includes a control processor 102 and a packet processing chip 104. Packet processing chip 104 includes shared memory 106, private memories 108a-n, packet processors 110a-n, instruction memories 112a-n, header memories 114a-n, payload memory 122, ingress ports 116, separator and scheduler 118, buffer manager 120, egress ports 124, control and status unit 128 and custom hardware acceleration blocks 126a-n. It is to be appreciated that n and m are arbitrary numbers and may vary based on implementation. In an embodiment, packet processing architecture 100 is on a single chip. In an alternate embodiment, packet processing chip 104 is distinct from control processor 102 which is on a separate chip. Packet processing architecture 100 may be part of any telecommunications device, including but not limited to, a router, an edge router, a switch, a cable modem and a cable modem headend.

Figure 1B:
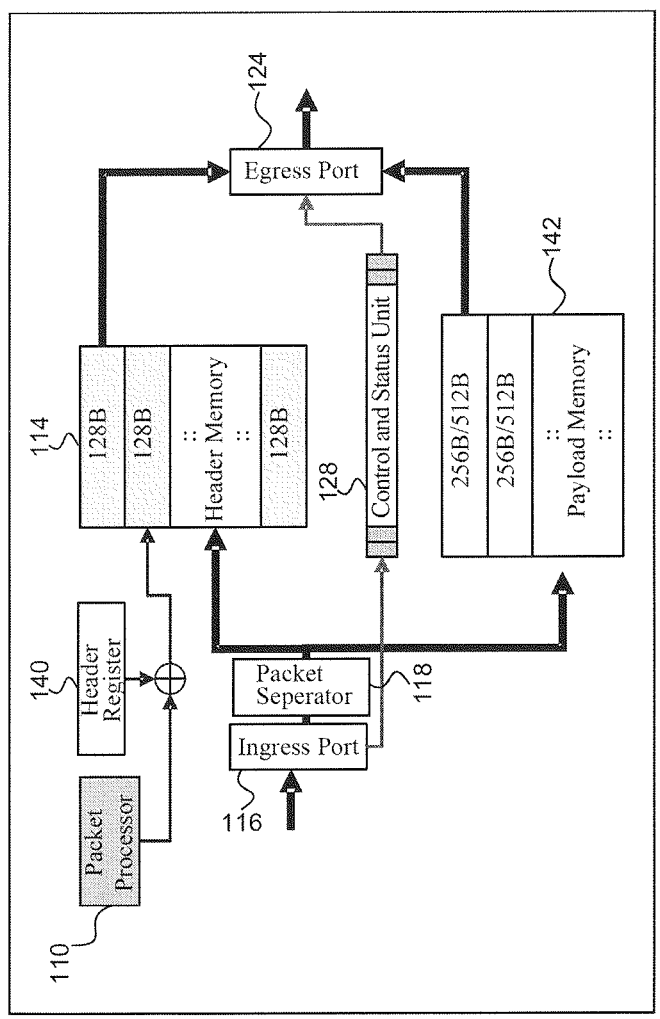
FIG. 1B illustrates an example packet processing architecture according to an embodiment.

In operation, ingress ports 116 receive packets from a packet source. The packet source may be, for example, a cable modem headend or the internet. Ingress ports 116 forward received packets to separator and scheduler 118. Each packet typically includes a header and a payload. Separator and scheduler 118 separates the header of each incoming packet from the payload. Separator and scheduler 118 stores the header in header memory 114 and stores the payload in payload memory 122. FIG. 1B further describes the separation of the header and the payload.

FIG. 1B illustrates an example architecture to separate a header from a payload of an incoming packet according to an embodiment. When a new packet arrives via one of ingress ports 116, a predetermined number of bytes, for example 96 bytes, representing a header of the packet are pushed into an available buffer in header memory 114 by separator and scheduler 118. In an embodiment, each buffer in header memory buffer 114 is 128 bytes wide. 32 bytes may be left vacant in each buffer of header memory 114 so that any additional header fields, such as Virtual Local Area Network (VLAN) tags may be appended to the existing header by packet processor 110. Status data, such as context data and priority level, of each new packet may be stored in a status queue 125 in control and status unit 128. Status queue 127 allows packet processor 110 to track and/or change the context of incoming packets. After processing a header of incoming packets, control and status data for each packet is updated in the status queue 125 by a packet processor 110.

Still referring to FIG. 1B, each packet processor 110 may be associated with a header register 140 which stores an address or offset to a buffer in header memory 114 that is storing a current header to be processed. In this example, packet processor 110 may access header memory 114 using an index addressing mode. To access a header, a packet processor 110 specifies an offset value indicated by header register 140 relative to a starting address of buffers in header memory 114. For example, if the header is stored in the second buffer in header memory 114, then header register 140 stores an offset of 128 bytes.

Figure 1C:
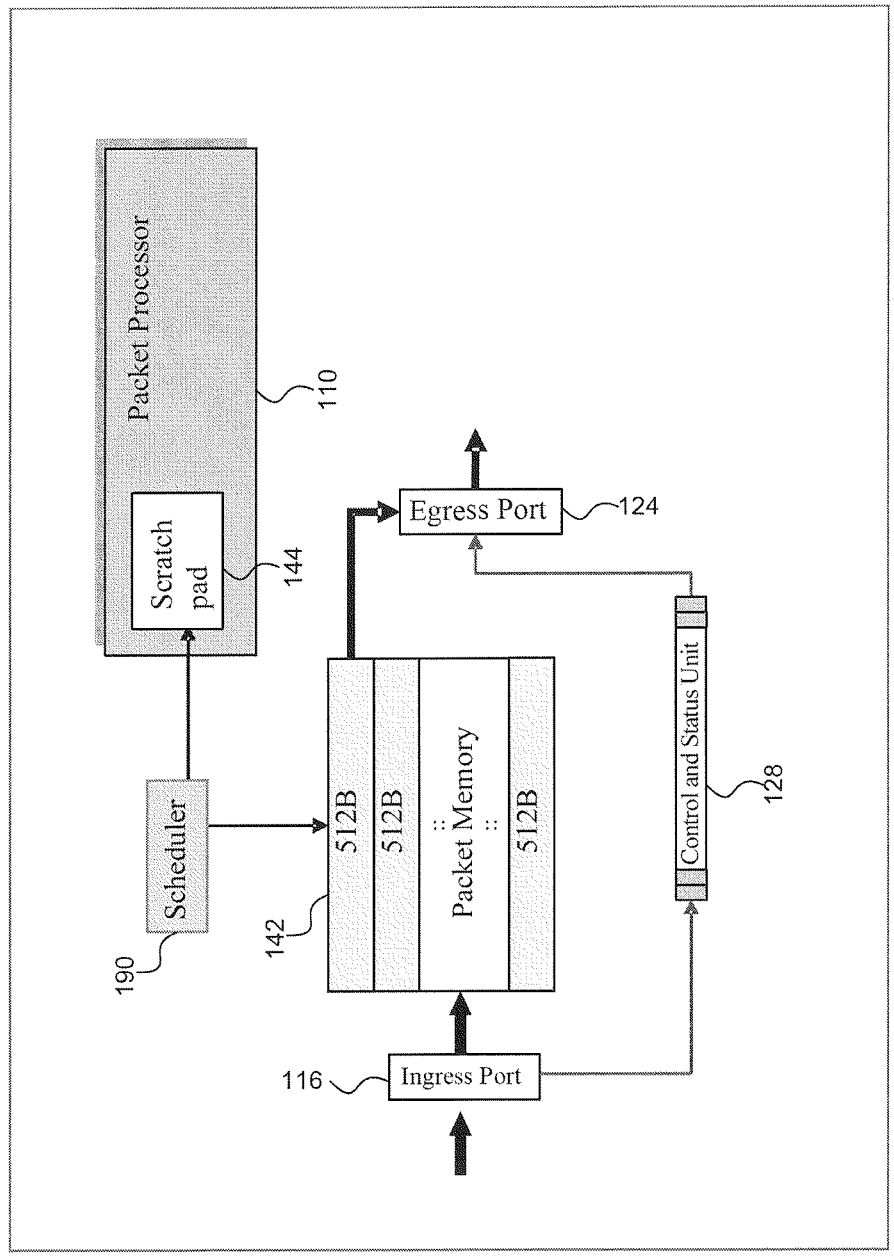
FIG. 1C illustrates an example packet processing architecture according to an embodiment.

FIG. 1C illustrates an alternate architecture to store the packet according to an embodiment. In the example in FIG. 1C, each packet processor 110 has 128 bytes of dedicated scratch pad memory 144 that is used to store a header of a current packet being processed. In this example, there is a single packet memory 142 that is a combination of header memory 114 and payload memory 122. Upon receiving a packet from an ingress port 116, scheduler 190 stores the packet in a buffer in packet memory 142. Scheduler 190 also stores a copy of the header of the received packet in the scratch pad memory 144 internal to packet processor 110. In this example, packet processor 110 processes the header in its scratch pad memory 144 thereby providing extra speed since it does not have to access a header memory 114 to retrieve or store the header.

Still referring to FIG. 1C, upon completion of header processing, scheduler 190 pushes the modified header in the scratch pad memory 144 of packet processor 110 into the buffer storing the associated packet in packet memory 142, thereby replacing the old header with the modified header. In this example, each buffer in packet memory 142 may be 512 bytes. For packets longer than 512 bytes, a scatter-gather-list (SGL) 127 (as shown in FIG. 1A) of buffers may be formed to store the larger packet or part of the larger packet. In the present example, a received packet may be stored at an offset of 32 bytes in each packet buffer of packet memory 142. The starting 32 bytes of each buffer may be reserved to allow packet processor 110 to expand the header, for example for VLAN tag additions. The byte size mentioned herein is only exemplary, as one skilled in the art would know that other byte sizes could be used without deviating from the embodiments presented herein.

Referring now to FIG. 1A, separator and scheduler 118, assigns a header of an incoming packet to a packet processor 110 based on availability and load level of the packet processor 110. In an example, separator and scheduler 118 may assign headers based on the type or traffic class as indicated in fields of the header. In an example, for a packet type based allocation scheme, all User Datagram Protocol (UDP) packets may be assigned to packet processor 110a and all Transmission Control Protocol (TCP) packets may be assigned to packet processor 110b. In another example, for a traffic class based allocation scheme, all Voice over Internet Protocol (VoIP) packets may be assigned to packet processor 110c and all data packets may be assigned to packet processor 110d. In yet another example, packets may be assigned by separator and scheduler 118 based on a round-robin scheme, based on a fair queuing algorithm or based on ingress ports from which the packets are received. It is to be appreciated that the scheme used for scheduling and assigning the packets is a design choice and may be arbitrary.

Still referring to FIG. 1A, upon receiving a header from separator and scheduler 118 or upon retrieving a header from a header memory 114 as indicated by separator and scheduler 118, processor 110a parses the header to extract data in the fields of the header. Based on data in the fields of the header, the packet processor 110 determines whether the header is to be processed by itself or if the header is to be sent to a custom hardware acceleration block 126 for processing. For example, if the header fields indicate policy based processing is needed, packet processor 110a may send data in header fields, including but not limited to, receive port, transmit port, Media Access Control Source Address (MAC-SA), Internet Protocol (IP) source address, IP destination address session identification etc. to a custom hardware acceleration block such as policy engine 126j (see FIG. 3) for further processing. In another example, if the data in the header fields indicate that the packet is an encrypted packet, packet processor 110 sends the header to control processor 102 for processing.

Control processor 102 may selectively process headers based on instructions from the packet processor 110, for example, for encrypted packets. Control processor 102 may also provide an interface for instruction code to be stored in instruction memory 112 of the packet processor and an interface to update data in tables in shared memory 106 and/or private memory 108. Control processor may also provide an interface to read status of components in chip 104 and to provide control commands components of chip 104.

In a further example, packet processor 110, based on a data rate of incoming packets, determines whether packet processor 110 itself or one or more of custom hardware acceleration blocks 126 should process the header. For example, for low incoming data rate or a low required performance level, packet processor 110 may itself process the header. For high incoming data rate or a high required performance level, packet processor 110 may offload processing of the header to one or more of custom hardware acceleration blocks 126. In the event that packet processor 110 processes a packet header itself instead of offloading to custom hardware acceleration blocks 126, packet processor 110 may execute software versions of the custom hardware acceleration blocks 126.

It is a feature of embodiments presented herein, that packet processors 110a-n may continue to process incoming headers while a current header is being processed by custom hardware acceleration block 126 or control processor 102 thereby allowing for faster and more efficient processing of packets. In an embodiment, incoming packet traffic is assigned to packet processors 110a-n by separator and scheduler 118 based on a round robin scheme. In another embodiment, incoming packet traffic is assigned to packet processors 110a-n by separator and scheduler 118 based on availability of a packet processor 110. Multiple packet processors 110a-n also allow for scheduling of incoming packets based on, for example, priority and/or class of traffic.

Custom hardware acceleration blocks 126 are configured to process the header received from packet processor 110 and generate header modification data. Types of hardware acceleration blocks 126 include but are not limited to, (see FIG. 2) policy engine 126j that includes resource management engine 126a, classification engine 126b, filtering engine 126c and metering engine 126d; handling and forwarding engine 126e; and traffic management engine 126k that includes queuing engine 126f, shaping engine 126g, congestion avoidance engine 126h and scheduling engine 126i. Custom hardware acceleration blocks 126a-k may process headers based on one or more of incoming bandwidth requirements or data rate requirements, type, priority level, and traffic class of a packet and may generate header modification data as described below in further detail below with respects to FIGS. 2 and 3. Type of the packet may be, including but not limited to, Ethernet, Internet Protocol (IP), Point-to-Point Protocol Over Ethernet (PPPoE), UDP and TCP. The traffic class of a packet may be, for example, VoIP, File Transfer Protocol (FTP), Hyper Text Transfer Protocol (80), video or data. The priority of the packet may be based on, for example, the traffic class of the packet. For example, video and audio data may be higher priority than FTP data. In alternate embodiments, the fields of the packet may determine the priority of the packet. For example a field of the packet may indicate the priority level of the packet.

Header modification data generated by custom acceleration blocks 126 is sent back to the packet processor 110 that generated the request for hardware accelerated processing. Upon receiving header modification data from custom hardware acceleration blocks 126, packet processor 110 modifies the header using the header modification data to generate a modified header. Packet processor 110 determines location of payload associated with the modified header based on data in control and status unit 128. For example, status queue 125 in control and status unit 128 may store an entry that identifies location of a payload in payload memory 122 associated with the header processed by packet processor 110. Packet processor 110 combines the modified header with the payload to generate a processed packet. Packet processor 110 may optionally determine the egress port 124 from which the packet is to be transmitted, for example from a lookup table in shared memory 106 and forward the processed packet to egress port 124 for transmission. In an alternate embodiment, egress ports 124 determine the location of the payload in the payload memory 122 and the location of a modified header, stored in header memory 114 by a packet processor 110, based on data in the control and status unit 128. One or more egress ports 124 combine the payload from payload memory and the header from header memory 114 and transmit the packet.

Figure 4:
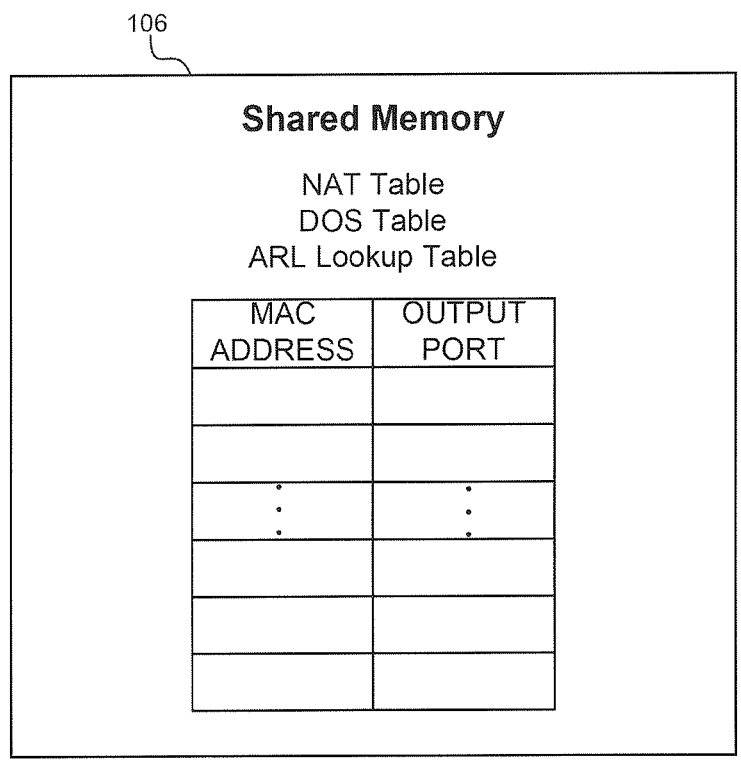
FIG. 4 illustrates a shared memory according to an embodiment.

In an example, a shared memory architecture may be utilized in conjunction with a private memory architecture. Shared memory 106 speeds up processing of packets by packet processing engines 110 and/or custom hardware acceleration logic 126 by storing commonly used data structures. In the shared memory architecture, each of packet processors 110a-n share the address space of shared memory 106. FIG. 4 illustrates shared memory 106 according to an embodiment. Shared memory 106, may be used to store, for example, tables that are commonly used by packet processors 110 and/or custom hardware acceleration logic 126. For example, shared memory 106 may store ARL (Address Resolution Lookup) table for Layer-2 switching, NAT (Network Address Translation) table for providing a single virtual IP address to all systems in a protected domain by hiding their addresses, and quality of service (QoS) tables that specify the priority, bandwidth requirement and latency characteristics of classified traffic flows or classes, as shown in FIG. 4. Shared memory 106 allows for a single update of data as opposed to individually updating data in private memory 108 of each of packet processors 110a-n. Storing commonly shared data structures in shared memory 126 circumvents duplicate updates of data structures for each packet processor 110 in associated private memories 108, thereby saving the extra processing power and time required for multiple redundant updates. For example, a shared memory architecture offers the advantage of a single update to a port mapping table in shared memory 106 as opposed to individually updating each port mapping table in each of private memories 108.

Control and status unit 128 stores descriptors and statistics for each packet. For example, control and status unit 128 engine stores a location of a payload in payload memory 122 and a location of an associated header in header memory 114 for each packet. It also stores the priority levels for each packet and which port the packet should be sent from. Packet processor 110 updates packet statistics, for example, the priority level, the egress port to be used, the length of the modified header and the length of the packet including the modified header. In an example, the status queue 125 stores the priority level and egress port for each packet and the scatter gather list (SGL) 127 stores the location of the payload in payload memory 122, the location of the associated modified header in header memory 114, the length of the modified header and the length of the packet including the modified header.

Embodiments presented herein also offer the advantages of a private memory architecture. In the private memory architecture, each packet processor 110 has an associated private memory 108. For example, packet processor 110a has an associated private memory 108a. The address space of private memory 108a is accessible only to packet processor 110a and is not accessible to packet processors 110b-n. A private address space grants each packet processor 110, a distinct, exclusive address space to store data for processing incoming headers. The private address space offers the advantage of protecting core header processing operations of packet processors 110 from corruption. In an embodiment, custom hardware acceleration blocks 126a-m have access to private address space of each packet processor 110 in private memory 108 as well as to shared memory address space in shared memory 106 to perform header processing functions.

Buffer manager 120 manages buffers in payload memory 122. For example, buffer manager 120 indicates, to separator and scheduler 118, how many and which packet buffers are available for storage of payload data in payload memory 122. Buffer manger 120 may also update control and status unit 128 as to a location of a payload of each packet. This allows control and status unit 128 to indicate to packet processor 110 and/or egress ports 124 where a payload associated with a header is located in payload memory 122.

Figure 1D:
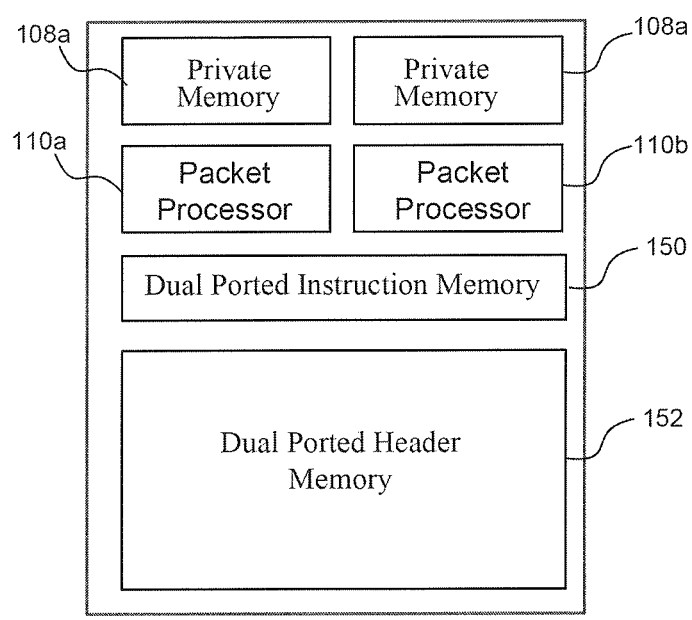
FIG. 1D illustrates a dual ported memory architecture according to an embodiment.

In an embodiment, each packet processor has an associated single ported instruction memory 112 and a single ported header memory 114 as shown in FIG. 1A. In an alternate embodiment, as shown in FIG. 1D, a dual ported instruction memory 150 and a dual ported header memory 152 may be shared by two processors. Sharing a dual ported instruction memory 150 and a dual ported header memory 152 allows for savings in memory real estate if both packet processors 110a and 110b share the same instruction code and process the same headers in conjunction.

In the embodiments presented herein, it is to appreciated that packet processor 110 may be any type of generic programmable processor such as a MIPS®, INTEL® or AMD® processor that can process instructions according to the packet processing instructions described herein. It is also to be noted that custom hardware acceleration logic 126 is different from generic processors, such as packet processors 110, since it is hard wired logic operations.

Figure 2:
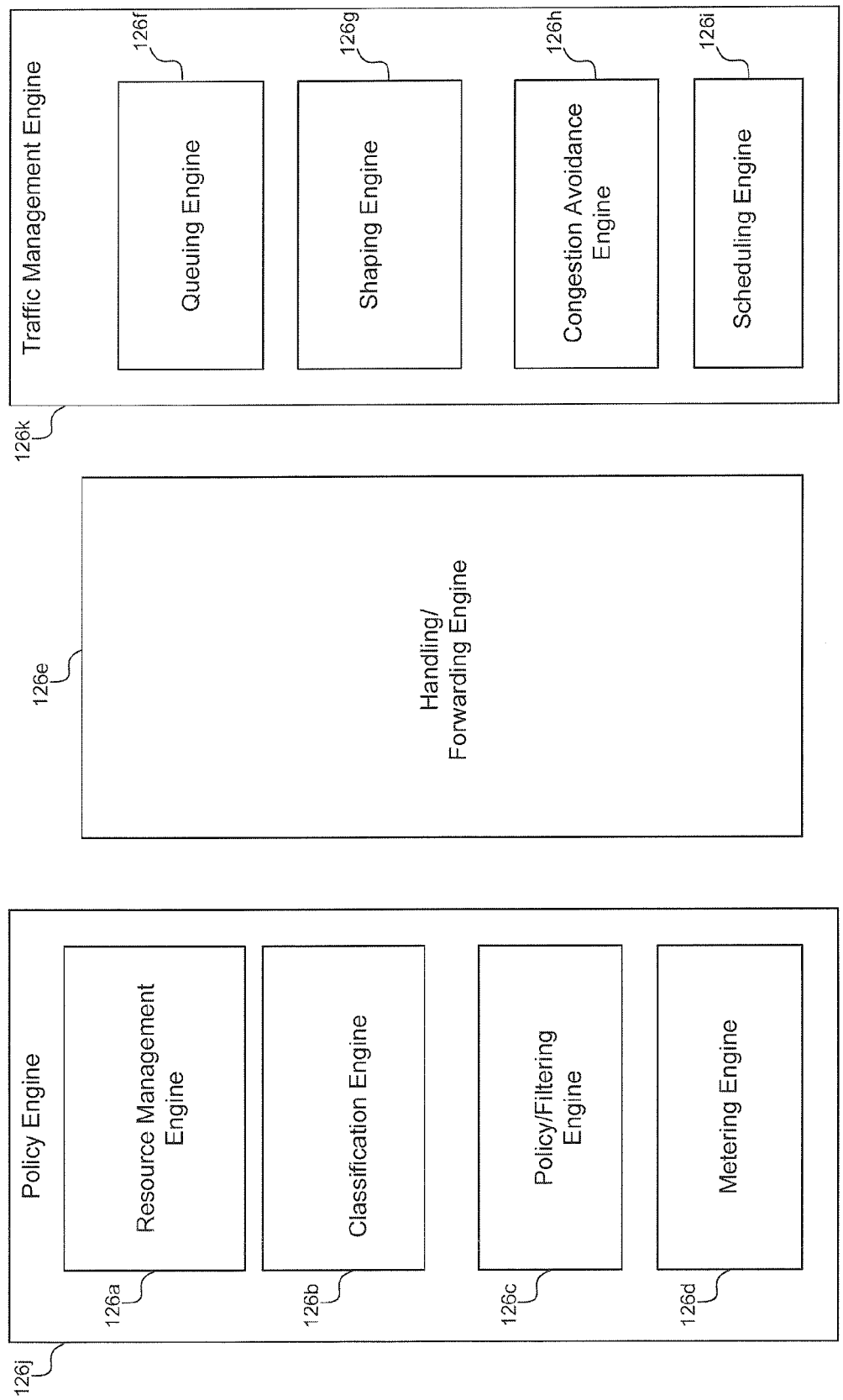
FIG. 2 illustrates example custom hardware acceleration blocks according to an embodiment.

FIG. 2 illustrates example custom hardware acceleration blocks 126a-k according to an embodiment. Policy engine 126j includes resource management engine 126a, classification engine 126b, filtering engine 126c and metering engine 126d. Policy engine 126c is described below further in detail with respect to FIG. 3. Traffic management engine 126k includes queuing engine 126f, shaping engine 126g, congestion avoidance engine 126h and scheduling engine 126i.

Resource management engine 126a determines the number of buffers in payload memory 122 that may be reserved by a particular flow of incoming packets. Resource management engine 126a may determine the number of buffers based on the priority of the packet and/or the type of flow. Resource management engine 126a adds to an available buffer count as buffers are released upon transmission of a packet. Resource management engine 126a also deducts from the available buffer count as buffers are allocated to incoming packets.

Classification engine 126b determines the class of the packet based on its service identification flow (SID) and determines/changes the quality of service (QoS) parameters in the header of the packet.

Filtering engine 126c is a firewall engine that determines whether the packet is to be processed or to be dropped.

Metering engine 126d determines the amount of bandwidth that is to be allocated to a packet of a particular traffic class. For example, metering engine 126d, based on lookup tables in shared global memory 106, determines the amount of bandwidth that is to be allocated to a packet of a particular traffic class. For example, video and VoIP traffic may be assigned greater bandwidth.

Handling/forwarding engine 126e determines the quality of service, IP (Internet Protocol) precedence level, transmission port for a packet, and the priority level of the packet. For example, video and voice data may be assigned a higher level of priority than File Transfer Protocol (FTP) or data traffic.

Queuing engine 126f determines a location in a transmission queue of a packet that is to be transmitted.

Shaping engine 126g determines the amount of bandwidth to be allocated for each packet of a particular flow.

Congestion avoidance engine 126h avoids congestion by dropping packets that have the lowest priority level. For example, packets that have been marked by QoS meter 310 (see FIG. 3) as having low priority may be dropped by congestion avoidance engine 126h. In another embodiment, congestion avoidance engine 126h delays transmission of low priority packets by buffering them, instead of dropping low priority packets, to avoid congestion.

Scheduling engine 126i arranges packets for transmission in the order of their priority. For example, if there are three high priority packets and one low priority packet, scheduling engine 126i may transmit the high priority packets before the low priority packet.

Figure 3:
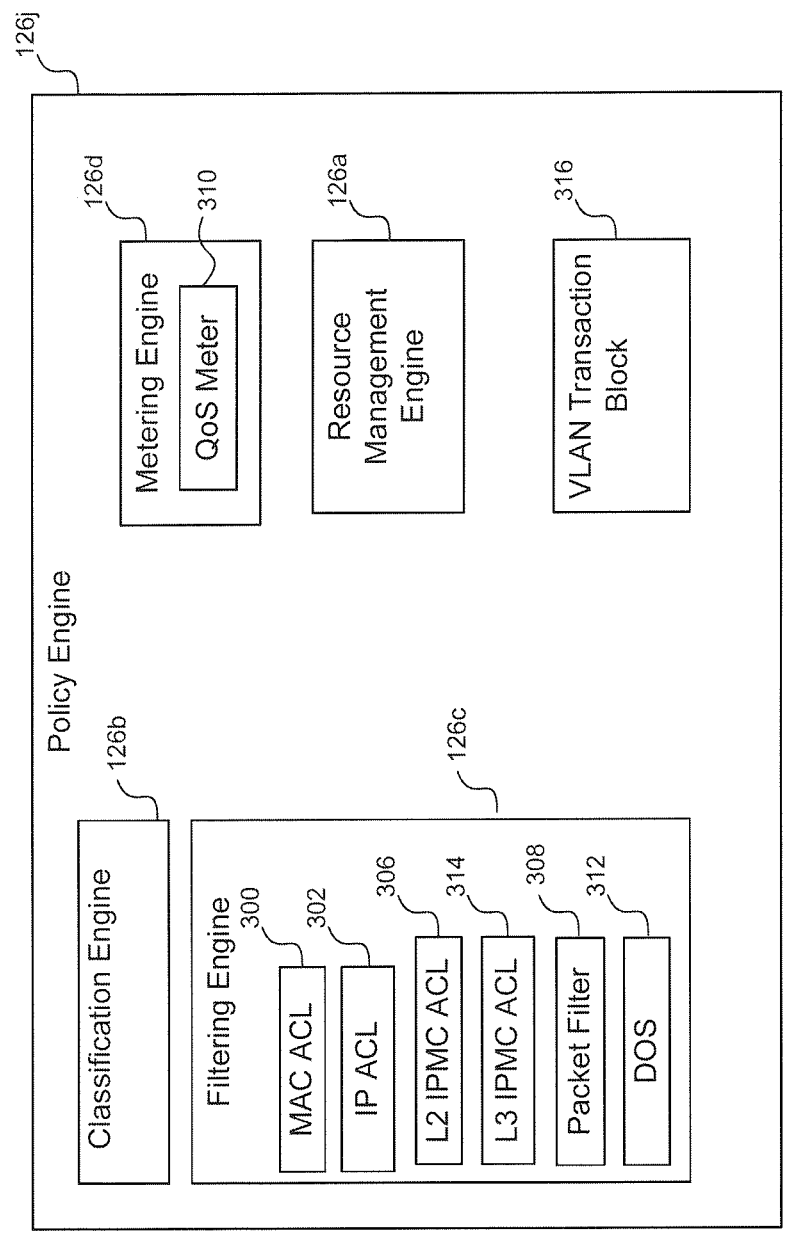
FIG. 3 illustrates a policy engine according to an embodiment.

FIG. 3 illustrates policy engine 126j according to an embodiment. Policy engine 126j includes resource management engine 126a, classification engine 126b, filtering engine 126c, metering engine 126d and VLAN translation block 316. Filtering engine 126c includes Media Access Control Admission control List (MAC ACL) 300, Internet Protocol IP ACL 302, Layer 2 Internet Protocol MultiCast (L2 IPMC) ACL 306, Layer 3 Internet Protocol MultiCast (L3 IPMC) ACL 314, packet filter 308 and Denial of Service (DOS) engine 314. Metering engine includes Quality of Service (QoS) meter 310.

Classification engine 126b takes as inputs packet header fields such as the MAC addresses, the IP addresses and port numbers. Classification engine 126b may perform one or multiple lookup operations in an internal classification table and generate a label that indicates a packet flow and/or a traffic class for the packet. The internal label is then provided to the metering engine 126d that uses the label to lookup tables and regulate packet flows as described above.

According to an embodiment, packet processor 110 parses the fields of a header of a received packet and provides data (or "keys") to the policy engine 126j for processing. Example keys include but are not limited to:

1. Rx port which is the input port of the packet.
2. Tx port which is the output port for the packet.
3. MAC SA which is the source Media Access Control (MAC) address.
4. MAC DA which is the destination MAC address.
5. S-VID which is the outer VLAN ID (VID) or Internet Service Provider (ISP VID).
6. C-VID which is the inner VLAN ID or customer VID.
7. S-pbits which are priority bits carried in an outer tag.
8. C-pbits which are priority bits carried in an inner tag.
9. Ethertype which indicates the ethertype.
10. IP SA which is a source Internet protocol (SIP) address specified in a prefix of the packet.
11. IP DA which is a destination Internet protocol (DIP) address which is also specified in a prefix of the packet.
12. Source port (sp) which is the source port specified in a range.
13. Destination port (dp) which is the destination port specified in a range.
14. TCP ACK which is the acknowledge bit.
15. TOS which indicates Type-of-Service.
16. Protocol which indicates the transport protocol e.g. TCP or UDP etc.
17. Session ID which indicates the type of session e.g. PPPoE or IP etc.
18. Length which indicates a length of the packet. It serves two purposes, one for rate limiting and another for filtering packets smaller than a predetermined size.
19. Miscellaneous indicators which may signal, for example, if the packet is a broadcast frame, a TCP Synchronization (SYN) packet, or an ICMP echo reply.

Based on the data or keys received from the packet processor 110, policy engine 126j may accept, reject or re-direct a packet. For example, MAC Admission Control List (MAC ACL) 300 is used to determine whether a MAC address of a device that originated the packet is in a pre-approved list or database of MAC addresses. If the MAC address of the originating device is not listed then the packet is dropped. Policy engine 126j also checks whether an IP address associated with the packet is listed in the IP Access Control List (IP ACL) 302. If the IP address of the device is not listed then the packet is dropped. Similarly, policy engine 126j determines whether the addresses match for Layer 2 Internet Protocol Multicast (L2 IPMC) list 306 and Layer 3 Internet Protocol Multicast (L3 IPMC) list 314. Policy engine 126j may also change the priority level of a packet.

Packet filter 308 is a firewall engine that determines whether the packet is to be dropped based on, for example, an IP address of the packet.

Denial of Service (DOS) engine 312 restricts requests from a particular traffic class or IP address to a pre-programmed number or requests per second.

QoS meter 310 determines an amount of bandwidth allocated for packets belonging to a particular flow to a predetermined level. For example, if a flow is limited to a bandwidth of 2 Mbps, and a current packet, if allowed to pass through exceeds that bandwidth allocation, then QoS meter 310 marks the packet "red" by setting a field in its header indicating that that packet is to be dropped by congestion avoidance engine 126h. The packet may be marked "yellow" to indicate that the packet may be dropped by congestion avoidance engine 126h to avoid congestion, if needed. The packet may be marked "green" to indicate that the packet does not exceed the allocated bandwidth for the flow and need not be dropped.

The VLAN translation block 316 based on certain fields of the header, determines a VLAN ID and/or priority bits to be used in a VLAN tag. For example, based on a Differentiated Services Code Point (DSCP) field of an IP packet, VLAN translation block 316 looks up a table and generates header modification data such as a VLAN tag and a priority bit. The VLAN tag and priority bit is header modification data used to modify a header and indicates the priority of the packet relative to the DSCP data in the IP field of the header.

Policy engine 126j may also override priority levels in the packet header as to the priority of the packet and the port by which the packet is to be transmitted. The modified priority and/or port may constitute the header modification data. Packet processor 110 receives the header modification data from policy engine 126j, modifies the priority level and egress port of the packet based on the received data and merges it with the payload in payload memory 122.

In summary, policy engine 126j may accepts, rejects or redirects packets, is a firewall and denial of service engine, determines an amount of bandwidth to be allocated to packets belonging to a particular flow, determines the VLAN ID and/or priority bits to be used in a VLAN tag, changes or assigns a priority level of a packet and/or determines a port to transmit a packet from.

Figure 5:
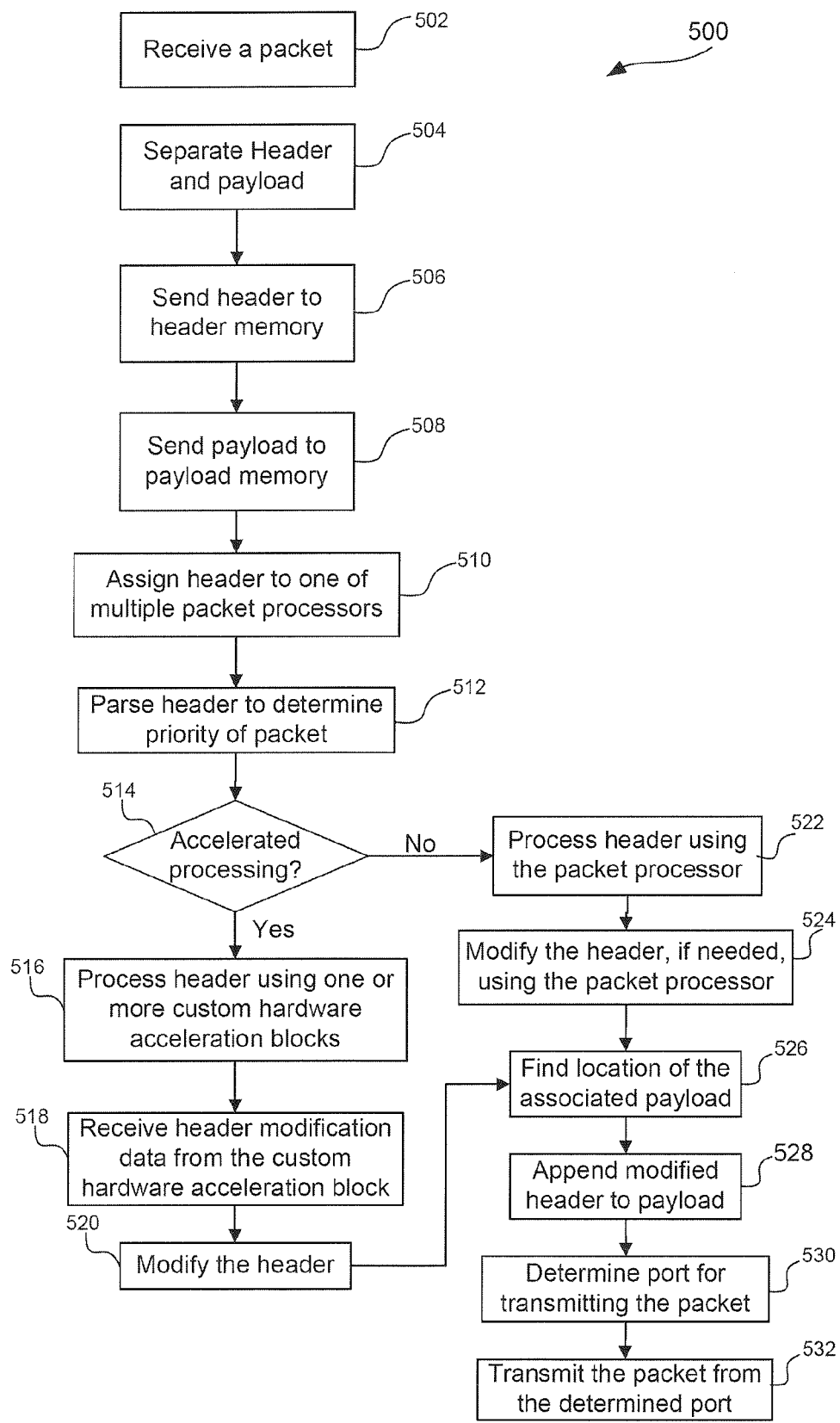
FIG. 5 illustrates an example flowchart to process a packet according to an embodiment.

FIG. 5 illustrates an example flowchart 500 to process a packet according to an embodiment. Flowchart 500 will be described with continued reference to the example operating environment depicted in FIGS. 1-4. However, the flowchart is not limited to these embodiments. Note that some steps shown in flowchart 500 do not necessarily have to occur in the order shown.

In step 502, a packet is received. For example, a packet is received from a packet source via ingress ports 116.

In step 504, the header and payload of the packet received in step 502 are separated. For example, separator and scheduler 118 separates the header and payload of the packet received in step 502.

In step 506, the header is sent to a header memory. For example, separator and scheduler 118 sends the header to a header buffer in header memory 114. In an alternate embodiment, scheduler 190 stores the entire packet in packet memory 142 and stores a copy of the header in a scratch pad memory 144 of a packet processor 110.

In step 508, the payload is sent to a buffer in payload memory. For example, separator and scheduler 118 sends the payload of the packet received in step 502 to a payload buffer in payload memory 122. In another embodiment, the payload along with the header is stored in a packet buffer in packet memory 142.

In step 510, the header is assigned one of the multiple packet processors. For example, separator and scheduler 118 assigns the header of the packet received in step 502 to one of packet processors 110 based on, for example, availability of the packet processor 110.

In step 512, the fields of the header are parsed. In other words, individual header fields are examined for their relevant contents. For example, packet processor 110 parses the fields of the header received in step 510.

In step 514, it is determined whether the header is to be processed using hardware acceleration based on, for example, data in the fields of the header. For example, packet processor 110 based on the priority level, type and/or traffic class of the packet, as determined from fields in step 512, determines whether the header is to be processed using custom hardware acceleration blocks 126. In another example, based on incoming bandwidth and desired performance level, packet processor 110 determines whether the header should be processed by packet processor 110 or custom hardware acceleration blocks 126. If the header is not to be processed using hardware acceleration means then the process proceeds to step 522. If the header is to be processed using hardware acceleration means then the process proceeds to step 516.

In step 516, the header is processed using one or more custom hardware acceleration blocks. For example, one or more of custom hardware acceleration blocks 126 processes the header.

In step 518, header modification data is received from a custom hardware acceleration block. For example, header modification data is received by the processor 110 from one or more of custom hardware acceleration blocks 126.

In step 520, the header is modified based on the header modification data. For example, packet processor 110 modifies the header based on data received from one or more of custom hardware acceleration blocks 126. The process proceeds to step 526.

If accelerated processing is not required based on the priority of the packet and the parsed header in step 512, then in step 522, the header is processed using a packet processor. For example, in step 522 the header is processed using one or more packet processors 110.

In step 524, the header is modified, if needed, based on, for example a priority level, type and/or traffic class of the packet, by a packet processor. For example, a packet processor 110 modifies the header if needed.

In step 526, location of the payload of the packet is determined. For example, the location of the payload associated with the modified header is determined based on data in control and status unit 128.

In step 528, the modified header is appended to the payload. For example, the modified header is appended by either packet processor 110 or egress ports 124 to the associated payload in payload memory 122.

In step 530, a transmission port for the packet is determined. For example, based on data in the header of the packet or data in a lookup table in shared memory 106, it is determined which port the packet is to be transmitted from. The egress port to be used may be determined by logic in egress ports 124 or by packet processor 110.

In step 532, the packet is transmitted from the port determined in step 530. For example, the packet is transmitted from one or more egress ports 124.

Embodiments presented herein, or portions thereof, can be implemented in hardware, firmware, software, and/or combinations thereof. The embodiments presented herein apply to any communication system that utilizes packets for data transmission.

The representative packet processing functions described herein (e.g. functions performed by packet processors 110, custom hardware acceleration blocks 126, control processor 102, separator and scheduler 118 etc.) can be implemented in hardware, software, or some combination thereof. For instance, the method of flowchart 500 can be implemented using computer processors, such as packet processors 110 and/or control processor 102, computer logic, application specific circuits (ASIC), digital signal processors, etc., or any combination thereof, as will be understood by those skilled in the arts based on the discussion given herein. Accordingly, any processor that performs the signal processing functions described herein is within the scope and spirit of the embodiments presented herein.

Further, the packet processing functions described herein could be embodied by computer program instructions that are executed by a computer processor, for example packet processors 110, or any one of the hardware devices listed above. The computer program instructions cause the processor to perform the signal processing functions described herein. The computer program instructions (e.g. software) can be stored in a computer usable medium, computer program medium, or any storage medium that can be accessed by a computer or processor. Such media include a memory device, such as instruction memory 112 or shared memory 106, a RAM or ROM, or other type of computer storage medium such as a computer disk or CD ROM, or the equivalent. Accordingly, any computer storage medium having computer program code that cause a processor to perform the signal processing functions described herein are within the scope and spirit of the embodiments presented herein.

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A method to process a packet, comprising:
   receiving a packet including a header and a payload;
   parsing fields of the header using a packet processor;
   determining whether the header is to be processed by a hardware accelerator of a plurality of hardware accelerators that each include corresponding circuitry, or by the packet processor based on the fields of the header; and
   in response to determining the header is to be processed by the hardware accelerator:
      selecting the hardware accelerator from the plurality of hardware accelerators based on the fields of the header;
      sending, by the packet processor, the header to the hardware accelerator based on one or more of data in the fields of the header, an incoming data rate or an outgoing data rate;
      processing, by the hardware accelerator, the header based on one or more of the incoming data rate, the outgoing data rate, a type of packet, a traffic class of the packet or a priority level of the packet;
      processing a second header using the packet processor while the hardware accelerator processes the header;
      generating, by the hardware accelerator, header modification data based on the processing;
      sending the generated header modification data in a signal from the hardware accelerator to the packet processor;
      modifying, by the packet processor, the header based on the generated header modification data to generate a modified header; and
      transmitting a processed packet that includes the modified header and the payload.

2. The method of claim 1, further comprising, prior to the receiving:
   selecting the packet processor from a plurality of packet processors based on availability of the packet processor, wherein the selection of the packet processor is determined by a separator and scheduler.

3. The method of claim 1, further comprising, prior to the processing:
   separating the header and the payload using a separator and scheduler;
   storing the header in a header memory; and
   storing the payload in a payload memory.

4. The method of claim 1, further comprising, prior to the processing:
   storing the header and the payload in a packet memory using a scheduler; and
   storing a copy of the header in a scratch pad memory of the packet processor.

5. The method of claim 1, the modifying further comprising updating, using the packet processor, a status queue in a control and status unit with a location of the header in a header memory, a modified header length and a modified packet length.

6. The method of claim 1, further comprising, prior to the transmitting:
   determining a location of the payload in a payload memory based on data from a control and status unit;
   appending the modified header to the payload using one or more egress ports; and
   determining an egress port to transmit the packet from based on data in a lookup table stored in a shared memory, the shared memory comprising an address space that is shared by a plurality of packet processors.

7. The method of claim 1, the processing further comprising:
   determining a number of buffers in a payload memory to be allocated to store the payload.

8. The method of claim 1, the processing further comprising:
   determining a class of the packet based on its service identification flow (SID) and quality of service (QoS) parameters as indicated in the header.

9. The method of claim 1, the processing further comprising: changing quality of service (QoS) parameters of the packet.

10. The method of claim 1, the processing further comprising:
    determining whether the packet is to be dropped.

11. The method of claim 1, the processing further comprising:
    determining an amount of bandwidth to be allocated to the traffic class corresponding to the packet.

12. The method of claim 1, the processing further comprising:
    determining a location of the packet in a transmission queue.

13. The method of claim 1, the processing further comprising:
    determining whether the packet is to be dropped for congestion avoidance.

14. The method of claim 1, the processing further comprising:
    determining an order of the transmission for the packet, wherein high priority packets are placed in the order before low priority packets.

15. A system to process a packet, comprising:
    a header memory;
    a payload memory;
    an instruction memory;
    a plurality of hardware accelerators, each hardware accelerator of the plurality of hardware accelerators including corresponding circuitry, configured to process a header and generate header modification data based on the processed header, and transmit the generated header modification data in a signal; and a processor coupled to the instruction memory, the processor configured to, based on instructions stored in the instruction memory, parse the header, determine whether the header is to be processed by a hardware accelerator of the plurality of hardware accelerators or by the processor based on fields of the header, select the hardware accelerator from the plurality of hardware accelerators based on fields of the header when it is determined that the header is to be processed by the hardware accelerator, assign the header to the hardware accelerator for processing, process a second header while the hardware acceleration block processes the header, receive the generated header modification data from the hardware accelerator, modify the header using the generated header modification data to generate a modified header, determine a location of a payload associated with the header and merge the modified header with the payload in the payload memory to generate a processed packet.

16. The system of claim 15, wherein the processor is further configured to, based on the instructions stored in the instruction memory, receive the packet including the header and the payload, separate the header from the payload, store the payload in the payload memory and store the header in the header memory; and wherein the processor is further configured to, based on the instructions stored in the instruction memory, store data in a status queue relating to a location of the header in the header memory and, based on data from a packet processor, a modified header length and a modified packet length.

17. The system of claim 15, further comprising:

wherein the processor is further configured to, based on the instructions stored in the instruction memory, store the packet including the header and the payload into a packet memory; and wherein the processor is further to, based on the instructions stored in the instruction memory, store data in a status queue relating to a location of the packet in the packet memory and, based on data from a packet processor, a modified header length and a modified packet length.

18. The system of claim 15, further comprising:

a shared memory having a shared address space that is shared by a plurality of packet processors, the shared memory including a lookup table storing a port by which the packet is to be transmitted.

19. The system of claim 15, further comprising:

a control processor configured to, based on the instructions stored in the instruction memory, provide instruction code to be stored in an instruction memory of a packet processor, update data in tables in shared memory or private memory, and selectively process headers based on instructions from the packet processor.

20. The system of claim 15, wherein the processor is further configured to, based on the instructions stored in the instruction memory, allocate buffers in the payload memory to store the payload.

21. The system of claim 15, wherein the processor is further configured to, based on the instructions stored in the instruction memory, allocate buffers in a packet memory to store the packet.

22. The system of claim 15, wherein the hardware accelerator is a resource management engine configured to determine a number of buffers in the payload memory that can be allocated to the packet.

23. The system of claim 15, wherein the hardware accelerator is a classification engine configured to determine a class of the packet based on its service identification flow (SID) and to determine or change quality of service (QoS) parameters in the header.

24. The system of claim 15, wherein the hardware accelerator is configurable in accordance with specialized functions to be performed on the header.

* * * * *